(12) United States Patent
Leichtling et al.

(10) Patent No.: US 7,356,563 B1
(45) Date of Patent: Apr. 8, 2008

(54) METHODS OF ANNOTATING A COLLABORATIVE APPLICATION DISPLAY

(75) Inventors: Ivan J. Leichtling, Redmond, WA (US); Ido M. Ben-Shachar, Sammamish, WA (US); Robert W. Schmieder, Issaquah, WA (US); Kenneth L. Young, Sammamish, WA (US); Sukvinder S. Gill, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 10/164,686

(22) Filed: Jun. 6, 2002

(51) Int. Cl.
*G06F 15/16* (2006.01)

(52) U.S. Cl. .................. 709/204; 709/205; 709/217; 709/218; 709/238; 715/512; 715/528; 715/733; 715/734; 715/751; 345/5.1; 345/2.2

(58) Field of Classification Search ............... 709/204, 709/205, 217–218, 238; 715/512, 528, 529, 715/733, 734, 751, 753–754, 762, 782; 345/2.1, 345/2.2, 5.1
See application file for complete search history.

(56) References Cited

U.S. PATENT DOCUMENTS

| | | | |
|---|---|---|---|
| 4,386,416 A | 5/1983 | Giltner et al. |
| 4,631,521 A | 12/1986 | El-Sherbini |
| 4,672,459 A | 6/1987 | Kudo |
| 4,677,649 A | 6/1987 | Kunishi et al. |
| 4,783,834 A | 11/1988 | Anderson et al. |
| 4,814,987 A | 3/1989 | Miyao et al. |
| 4,823,122 A | 4/1989 | Mann et al. |
| 4,882,687 A | 11/1989 | Gordon |
| 4,897,799 A | 1/1990 | Le Gall et al. |
| 4,965,677 A | 10/1990 | Pennebaker et al. |
| 4,974,173 A | 11/1990 | Stefik et al. |
| 5,008,853 A | 4/1991 | Bly et al. |
| 5,057,916 A | 10/1991 | Krause et al. |
| 5,077,732 A | 12/1991 | Fischer et al. |

(Continued)

FOREIGN PATENT DOCUMENTS

WO    WO-99/26153 A2    5/1999

OTHER PUBLICATIONS

U.S. Appl. No. 10/127,951, filed Apr. 23, 2002, Schmieder et al.

(Continued)

*Primary Examiner*—Saleh Najjar
*Assistant Examiner*—Shawki S Ismail
(74) *Attorney, Agent, or Firm*—Perkins Coie LLP (57) ABSTRACT

Disclosed are methods for remote users of a collaborative application to generate annotation information, send that annotation information to an application sharer device, and receive back a display combining output of the collaborative application with the annotation information. A collaborative application display is visible on an application viewer's screen. To make an annotation, a user draws over the shared display. The annotation is intercepted and sent to the sharer. On the sharer, the annotation is graphically blended with the display produced by the collaborative application. The combination is then sent to the remote viewers for display. The sharer may visually indicate, via color or a text flag, for example, the source of each annotation. The sharer may time out an annotation, or may delete the annotation if the collaborative application's display has scrolled underneath the annotation, causing the annotation to "lose its place" in the display and become meaningless.

28 Claims, 9 Drawing Sheets

U.S. PATENT DOCUMENTS

| | | | |
|---|---|---|---|
| RE33,894 | E | 4/1992 | Bradley |
| 5,172,103 | A | 12/1992 | Kita et al. |
| 5,177,622 | A | 1/1993 | Yoshida et al. |
| 5,179,711 | A | 1/1993 | Vreeland |
| 5,206,934 | A | 4/1993 | Naef, III |
| 5,210,825 | A | 5/1993 | Kavaler |
| 5,241,625 | A | 8/1993 | Epard et al. |
| 5,241,653 | A | 8/1993 | Collins et al. |
| 5,255,361 | A | 10/1993 | Callaway et al. |
| 5,287,203 | A | 2/1994 | Namizuka |
| 5,298,992 | A | 3/1994 | Pietras et al. |
| 5,319,463 | A | 6/1994 | Hongu et al. |
| 5,390,262 | A | 2/1995 | Pope |
| 5,404,436 | A | 4/1995 | Hamilton |
| 5,408,600 | A | 4/1995 | Garfinkel et al. |
| 5,485,559 | A | 1/1996 | Sakaibara et al. |
| 5,491,780 | A | 2/1996 | Fyles et al. |
| 5,550,968 | A | 8/1996 | Miller et al. |
| 5,565,886 | A | 10/1996 | Gibson |
| 5,608,872 | A | 3/1997 | Schwartz et al. |
| 5,649,104 | A | 7/1997 | Carleton et al. |
| 5,655,152 | A | 8/1997 | Ohnishi et al. |
| 5,673,371 | A | 9/1997 | Koopman et al. |
| 5,699,524 | A | 12/1997 | Ooishi et al. |
| 5,717,856 | A | 2/1998 | Carleton et al. |
| 5,727,155 | A | 3/1998 | Dawson |
| 5,754,873 | A | 5/1998 | Nolan |
| 5,758,110 | A | 5/1998 | Boss et al. |
| 5,760,769 | A | 6/1998 | Petrie |
| 5,781,732 | A | 7/1998 | Adams |
| 5,815,151 | A | 9/1998 | Argiolas et al. |
| 5,831,872 | A | 11/1998 | Pan et al. |
| 5,835,713 | A | 11/1998 | FitzPatrick et al. |
| 5,847,706 | A | 12/1998 | Kingsley |
| 5,864,711 | A | 1/1999 | Mairs et al. |
| 5,874,960 | A | 2/1999 | Mairs et al. |
| 5,933,597 | A | 8/1999 | Hogan |
| 5,938,724 | A | 8/1999 | Pommier et al. |
| 5,949,435 | A | 9/1999 | Brock et al. |
| 5,986,655 | A * | 11/1999 | Chiu et al. ............... 715/839 |
| 5,995,096 | A | 11/1999 | Kitahara et al. |
| 6,008,804 | A * | 12/1999 | Pommier et al. ........... 715/753 |
| 6,025,871 | A | 2/2000 | Kantor et al. |
| 6,057,835 | A | 5/2000 | Sato et al. |
| 6,167,433 | A | 12/2000 | Maples et al. |
| 6,173,315 | B1 | 1/2001 | Deleeuw |
| 6,212,547 | B1 | 4/2001 | Ludwig et al. |
| 6,216,177 | B1 | 4/2001 | Mairs |
| 6,219,044 | B1 | 4/2001 | Ansberry et al. |
| 6,230,171 | B1 | 5/2001 | Pacifici |
| 6,275,223 | B1 * | 8/2001 | Hughes ..................... 715/751 |
| 6,285,363 | B1 | 9/2001 | Mairs et al. |
| 6,292,166 | B1 | 9/2001 | Palmer et al. |
| 6,304,928 | B1 | 10/2001 | Mairs et al. |
| 6,317,777 | B1 | 11/2001 | Skarbo et al. |
| 6,342,906 | B1 * | 1/2002 | Kumar et al. ............... 715/751 |
| 6,343,313 | B1 * | 1/2002 | Salesky et al. ............. 709/204 |
| 6,456,305 | B1 | 9/2002 | Qureshi et al. |
| 6,570,590 | B1 | 5/2003 | Dubrow et al. |
| 6,577,330 | B1 | 6/2003 | Tsuda et al. |
| 6,584,493 | B1 | 6/2003 | Butler |
| 6,601,087 | B1 | 7/2003 | Zhu et al. |
| 6,654,032 | B1 | 11/2003 | Zhu et al. |
| 6,687,878 | B1 * | 2/2004 | Eintracht et al. ........... 715/512 |
| 6,823,514 | B1 | 11/2004 | Degenaro et al. |
| 6,825,860 | B1 | 11/2004 | Hu et al. |
| 6,826,595 | B1 * | 11/2004 | Barbash et al. ............. 709/204 |
| 6,833,844 | B1 | 12/2004 | Shiota et al. |
| 6,910,188 | B2 | 6/2005 | Keohane et al. |
| 6,911,987 | B1 | 6/2005 | Mairs |
| 6,925,645 | B2 | 8/2005 | Zhu et al. |
| 6,973,627 | B1 | 12/2005 | Appling |
| 6,982,729 | B1 | 1/2006 | Lange et al. |
| 7,003,728 | B2 | 2/2006 | Berque |
| 2001/0000811 | A1 | 5/2001 | May et al. |
| 2002/0010713 | A1 | 1/2002 | Egilsson |
| 2002/0075304 | A1 | 6/2002 | Thompson et al. |
| 2002/0078088 | A1 * | 6/2002 | Kuruoglu et al. ........... 707/512 |
| 2002/0095399 | A1 | 7/2002 | Devine et al. |
| 2002/0174181 | A1 | 11/2002 | Wei |
| 2002/0184310 | A1 | 12/2002 | Traversat et al. |
| 2003/0028610 | A1 | 2/2003 | Pearson |
| 2003/0085922 | A1 | 5/2003 | Wei |
| 2003/0103088 | A1 | 6/2003 | Dresti et al. |
| 2003/0137522 | A1 | 7/2003 | Kaasila et al. |
| 2003/0167339 | A1 | 9/2003 | Zhu et al. |
| 2003/0189599 | A1 | 10/2003 | Ben-Shachar et al. |
| 2003/0189601 | A1 | 10/2003 | Ben-Shachar et al. |
| 2004/0024819 | A1 | 2/2004 | Sasaki et al. |
| 2004/0066408 | A1 | 4/2004 | Meyers et al. |
| 2004/0260717 | A1 * | 12/2004 | Albornoz et al. ........... 707/102 |
| 2005/0024389 | A1 | 2/2005 | Mairs et al. |
| 2005/0027896 | A1 | 2/2005 | Mairs et al. |
| 2005/0033817 | A1 | 2/2005 | Wei |
| 2005/0055306 | A1 | 3/2005 | Miller et al. |
| 2005/0216847 | A1 | 9/2005 | Zhu et al. |
| 2006/0190839 | A1 | 8/2006 | Ben-Shachar et al. |
| 2006/0288389 | A1 | 12/2006 | Deutscher et al. |

OTHER PUBLICATIONS

U.S. Appl. No. 10/153,501, filed May 22, 2002, Ben-Shachar et al.
U.S. Appl. No. 11/187,048, filed Jul. 22, 2005, Ben-Shachar et al.
U.S. Appl. No. 11/187,111, filed Jul. 22, 2005, Ben-Shachar et al.
http://www.microsoft.com/windows/netmeeting.
Screen Dumps of Microsoft Word 2000, Jun. 10, 1999 (8 pages).
Gutekunst, Thomas et al., "A Distributed and Policy-Free General-Purpose Shared Window System," Oct. 6, 1994, Feb. 1995 IEEE/ACM Transactions on Networking, 13 pages.
U.S. Appl. No. 11/343,650, filed Jan. 30, 2006, Ben-Shachar.
U.S. Appl. No. 11/344,361, filed Jan. 30, 2006, Ben-Shachar.
Hao, Ming C., Alan H. Karp and Daniel Garfinkel, "Collaborative Computing: A Multi-Client Multi-Server Environment," COOCS'95, © 1995 ACM, pp. 206-213.
U.S. Appl. No. 10/859,640, filed Jun. 3, 2004, Mairs et al.
Schroeder, Erica, "PictureTel Plans Low-Cost Video App Sharing," PC Week, vol. 11, No. 25, Jun. 27, 1994 (pp. 1 & 171).
"A Primer on the T.120 Series Standard," DataBeam Corporation, 1995 (pp. 1-13).
Intel Corporation, "Intel ProShare Personal Conferencing Software, Getting Started Guide," Intel Corporation, 1994 (pp. 25-31).
Schroeder, Erica, "Videoconferencing—Creative brings Mac package to Windows," Networking, PC Week, vol. 11, No. 25, Jun. 27, 1994 (pp. 83 & 88).

* cited by examiner

Combined Application and Annotation Display 400

For she, whose parts maintained a perfect music,
Whose beauties shined more than the blushing morning,
Who much did pass in state the stately mountains,
In straightness passed the cedars of the forests,
Hath cast me, wretch, into eternal evening,
By taking her two suns from these dark valleys.

For she, with whom compared the Alps are valleys,
She, whose least word brings from the spheres their music,
At whose approach the sun rose in the evening,
Who, where she went, bare in her forehead morning,*

Viewer A

Viewer B

* From "The Countess of Pembroke's Arcadia," Sir Philip Sidney

FIG. 4b

Combined Application and Annotation Display 400

For she, with whom compared the Alps are valleys,
She, whose least word brings from the spheres their music,
At whose approach the sun rose in the evening,
Who, where she went, bare in her forehead mornin⟨Viewer B⟩
Is gone, is gone from these our spoiled forests,
Turning to deserts our best pastured mountains.

These mountains witness shall, so shall these valleys,
These forests eke, made wretched by our music,
Our morning hymn this is, and song at evening.*

Viewer A

\* From "The Countess of Pembroke's Arcadia," Sir Philip Sidney

METHODS OF ANNOTATING A COLLABORATIVE APPLICATION DISPLAY

CROSS-REFERENCE TO RELATED APPLICATIONS

The present application is related to three other patent applications: "Document Viewing Mechanism for Document Sharing Environment", filed Apr. 15, 2002, Ser. No. 10/127,951; "Application Sharing Single Document Sharing", filed Apr. 3, 2002, Ser. No. 11/344,361; and "Application Sharing User Interface Improvements", filed Apr. 5, 2002, Ser. No. 11/401,519.

TECHNICAL FIELD

The present invention is related generally to collaborative computing applications, and, more particularly, to annotating a shared display of a collaborative computing application.

BACKGROUND OF THE INVENTION

The growth of computer networks, both local to one area and among remotely located areas, has spawned increased interest in collaborative computing applications. These applications allow users at multiple computing devices to work together, running the same application and viewing the same data. For example, consider a word-processing collaborative application. Through network connections, a set of users can see and collaboratively edit a document. In another example, a frustrated user shares an application's error logging screen with a remote technical support specialist. The user runs the application while the specialist views the logging screen to discover what causes the application to fail.

In many implementations, the collaborative application actually runs on only one device, called the "application sharer" or the "local device," and that device shares the collaborative application display with all other devices, called "application viewers" or "remote devices." On the sharer and on all of the viewers runs a collaborative computing utility program that allows remote users to see the same display created by the collaborative application for the sharer device. An advantage of these implementations is that the application need not be modified to support collaboration. The application may run for the sharer's user and be unaware that its display is shared to remote users.

In many scenarios, it is not enough for all users to be able to see the display produced by the collaborative application for the application sharer's device. Users at the remote devices would like to provide input to the display. Some collaboration systems allow the users to pass control among themselves so that each in turn can run the collaborative application as if it were running on his own device. In another scenario of remote user interaction, the collaborative application presents its display to all connected users. The remote users may not send input to the collaborative application, but they may wish to annotate the collaborative application display in order to call the attention of the other users to a particular point. Rather than relying on the traditional but confusing voice cues "Look, up near the top," "No, not that line, the one below it," "It's the, let's see, one, two, three, fourth column from the right," "I meant the 'thee,' not the 'the'," some collaborative computing utilities support visual annotation in which users "draw" on the collaborative application display. The users' annotations are not sent as input to the collaborative application, but they are displayed to all users.

In previous annotation systems, each user creates annotation information (which may include a pointer, a highlighted area, etc.) and sends this annotation information to all other users. Each device, including the annotator's, combines the annotation information with the display received from the collaborative application. This method has many shortcomings. First, there is no central control to coordinate the annotations from multiple users or to turn off annotations for a while if that is desired: every user can annotate at any time. The lack of central control also means that there is no guarantee that all users are seeing the same annotations, which can increase confusion in the collaborative effort beyond what it would have been without visual annotation. As the collaborative application is actually running only on the sharer, a remote user's annotations are not tied directly to the current application display, that is, the application may change the display after the remote user annotates it. Finally, the process of receiving annotations from all of the other users and combining that information with the shared display received from the collaborative application may tax the resources of a remote device, especially a lower-power portable or handheld device.

What is needed is an annotation system for collaborative applications that better coordinates the annotation input from all the users while presenting less of a burden to remote devices.

SUMMARY OF THE INVENTION

In view of the foregoing, the present invention provides a method for remote users of a collaborative application to generate annotation information, send that annotation information to an application sharer device, and receive back a display combining output of the collaborative application with the annotation information. Each viewer device only communicates with the sharer, not with the other viewers, and the viewers need not have the capability to graphically blend the application output with annotation information from their own, and potentially from all other, users.

A collaborative application display is visible on an application viewer's screen. To make an annotation, the user of the application viewer draws over the collaborative display. The drawing may be performed by moving a mouse, by invoking a paint program, or the like. In any case, the output of the user's annotation efforts is intercepted and is not displayed to the user's screen. Instead, the intercepted annotation information is sent to a central device, presumably the application sharer running the collaborative application.

On the application sharer, the annotation information is received, potentially from many remote users at the same time. The sharer has the opportunity to coordinate the annotation input, possibly by giving one set of remote users permission to annotate and ignoring annotation input from all other users. In some embodiments, permission to annotate may be passed from one user to another. The user of the sharer may also generate annotation input. In any case, the annotation input that the sharer device has decided to display is drawn into an annotation display on the sharer. That annotation display is graphically blended with the display produced by the collaborative application itself. The combination is then sent to the remote viewers.

On each remote application viewer, the received combination is simply displayed. Included in the display is what annotation information the sharer decided to accept. The remote viewers need not perform a graphics blend because they only receive one input stream, the combined display produced by the sharer.

In other aspects of the present invention, the application sharer uses its centralized position to further coordinate which annotations are displayed and how they are displayed. The sharer may visually indicate, via color or a text flag, for example, the source of each annotation. The sharer may time out an annotation, or may delete the annotation if the collaborative application's display has scrolled underneath the annotation, causing the annotation to "lose its place" in the collaborative display and become meaningless.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 1:
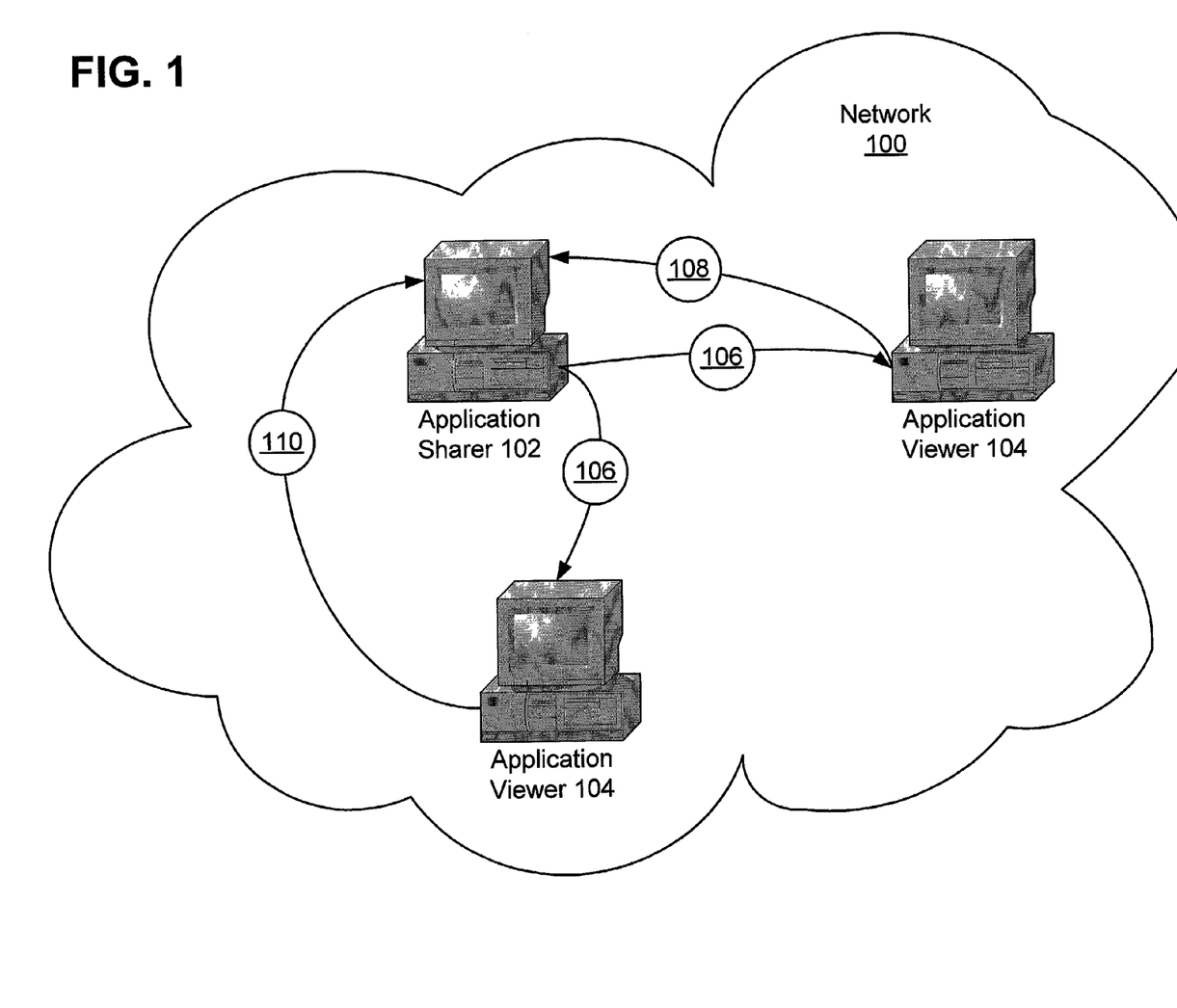
FIG. 1 is a block diagram showing an exemplary collaborative computing environment with an application sharer and remote application viewers.

FIG. 1 presents a typical collaborative computing scenario. In a network 100, which may range from a group of wireless-connected computing devices within a single room to the Internet, an application sharer computing device 102 runs a collaborative application. The display output produced by the collaborative application may be viewed on the application sharer 102 and on a number of application viewers 104. In a typical embodiment of collaborative computing, the application viewers 104 do not actually run a copy of the collaborative application. Instead, they run a collaborative computing utility program that receives the collaborative application's display output via data flows 106 from the sharer 102 and displays it on the application viewer 104. The collaborative computing utility may also receive control input from a user of a viewer 104 and then send it, via data flow 108 or 110, to the sharer 102. Generally, the application sharer 102 decides whether the control input reaches the collaborative application. In some cases, the application viewers 104 are passive and their control input is always discarded. In other cases, one device at a time, be it the application sharer 102 or one of the application viewers 104, is permitted to send control input to the collaborative application. Rarely would control input from all devices be passed unfettered to the collaborative application as that would lead to unpredictable behavior.

The present invention presents methods for visually annotating the collaborative application display. Users on the application sharer 102 and on the application viewers 104 may create visual annotations. In the case of the application viewers 104, these annotations travel to the application sharer 102 via the data flows 108 and 110. Upon reception, the application sharer 102 does not send this annotation input to the collaborative application, but merges it graphically with the collaborative application display. The merged image is then sent, via data flows 106, to the application viewers 104. Providing for annotation in this manner gives the application sharer 102 centralized control over all annotations and eases the burden on the application viewers 104 of merging annotations with the collaborative application display. This latter point is especially important when an application viewer 104 does not have the computing resources of a typical desktop computer but is a lower-power device, such as a handheld computer or an enhanced cellular telephone.

Figure 2:
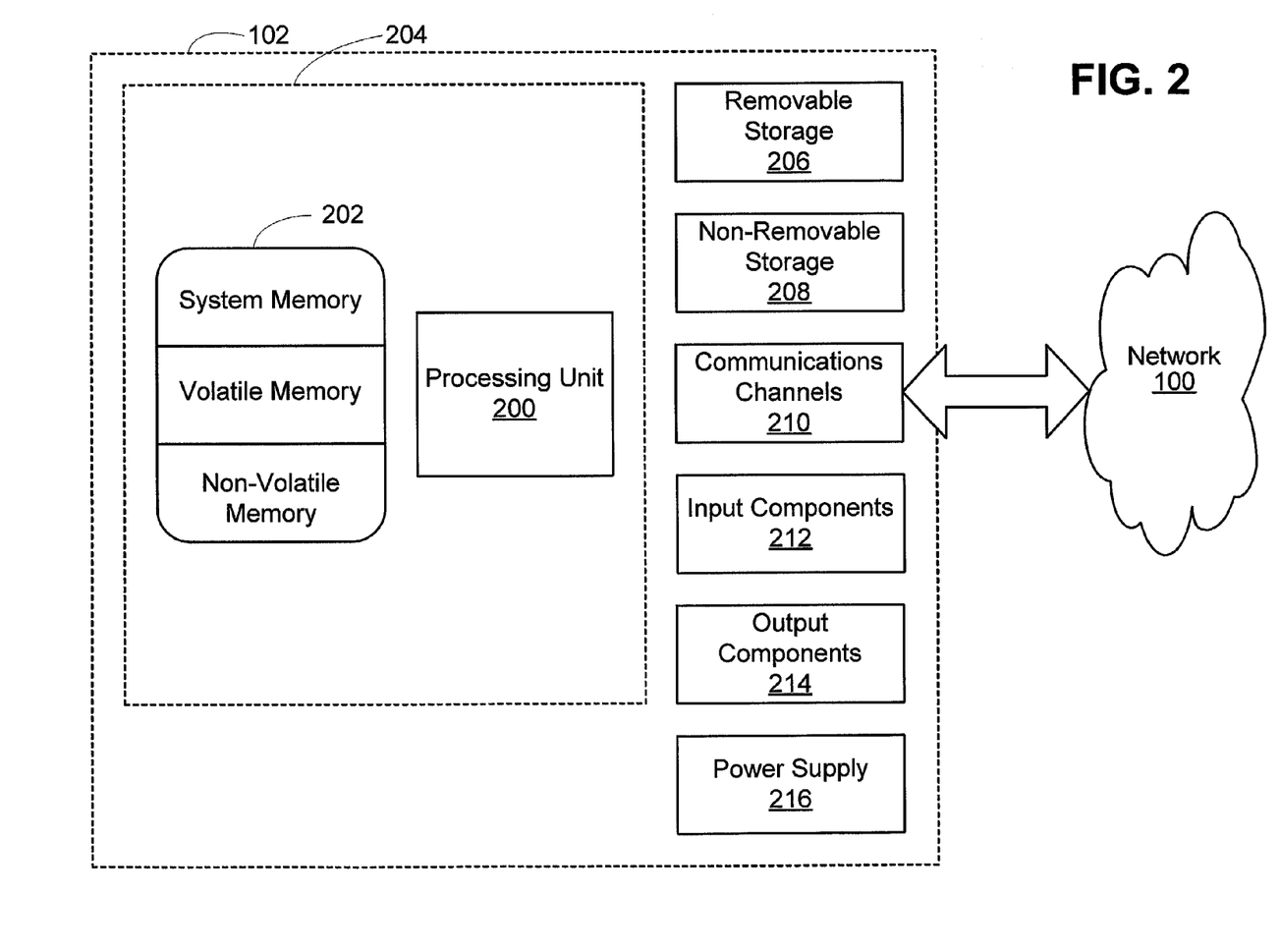
FIG. 2 is schematic diagram generally illustrating an exemplary computing system that supports the present invention.

The application sharer 102 and the application viewers 104 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the application sharer 102 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In its most basic configuration, the application sharer 102 typically includes at least one processing unit 200 and memory 202. The memory 202 may be volatile (such as RAM), nonvolatile (such as ROM or flash memory), or some combination of the two. This most basic configuration is illustrated in FIG. 2 by the dashed line 204. The application sharer 102 may have additional features and functionality. For example, the application sharer 102 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the application sharer 102. Any such computer-storage media may be part of the application sharer 102. The application sharer 102 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The application sharer 102 may also have input devices 212 such as a keyboard, mouse, pen, voice-input device, touch-input device, etc. Output devices 214 such as a display, speakers, and printer may also be included. All these devices are well know in the art and need not be discussed at length here.

Figure 3A:
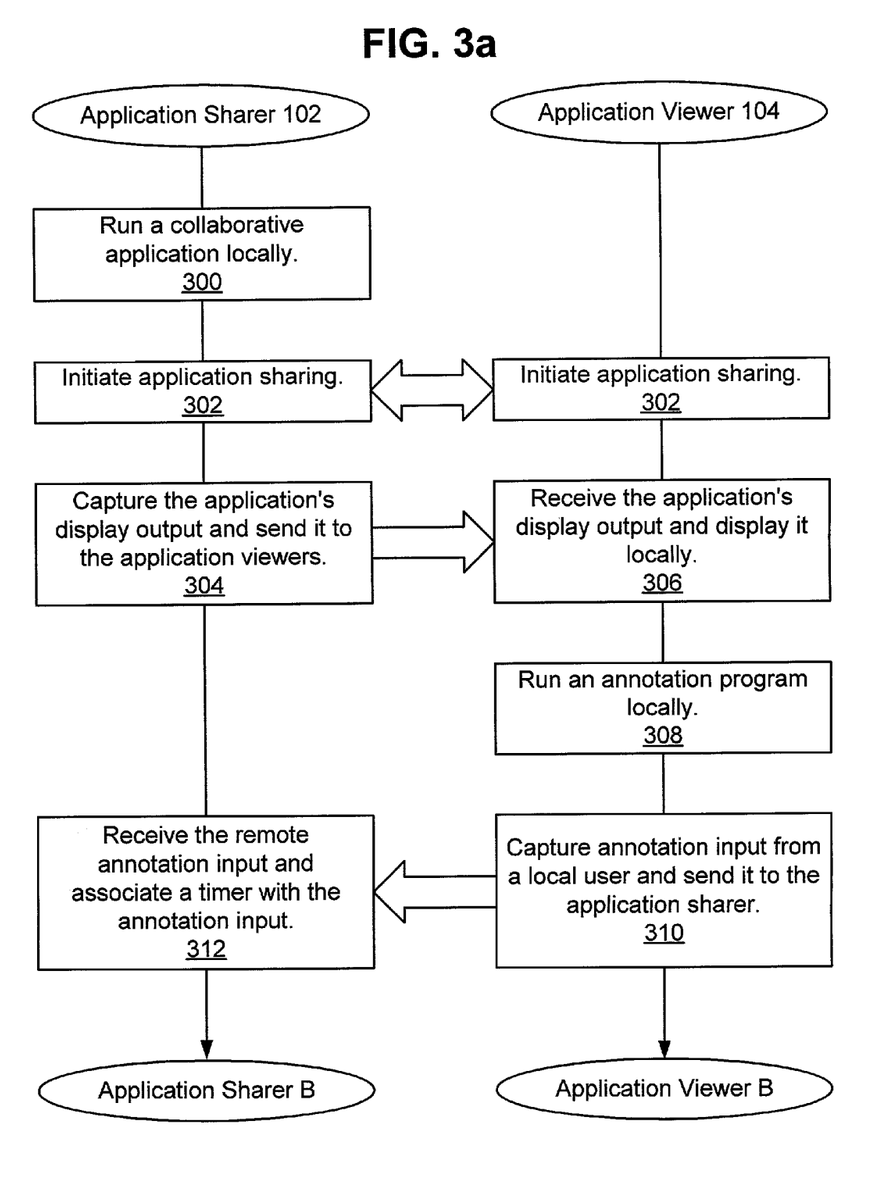
FIGS. 3a through 3c together form a dataflow diagram generally showing the information passed and the operations performed when a user at an application viewer annotates the collaborative application display received from the application sharer.
Figure 3B:
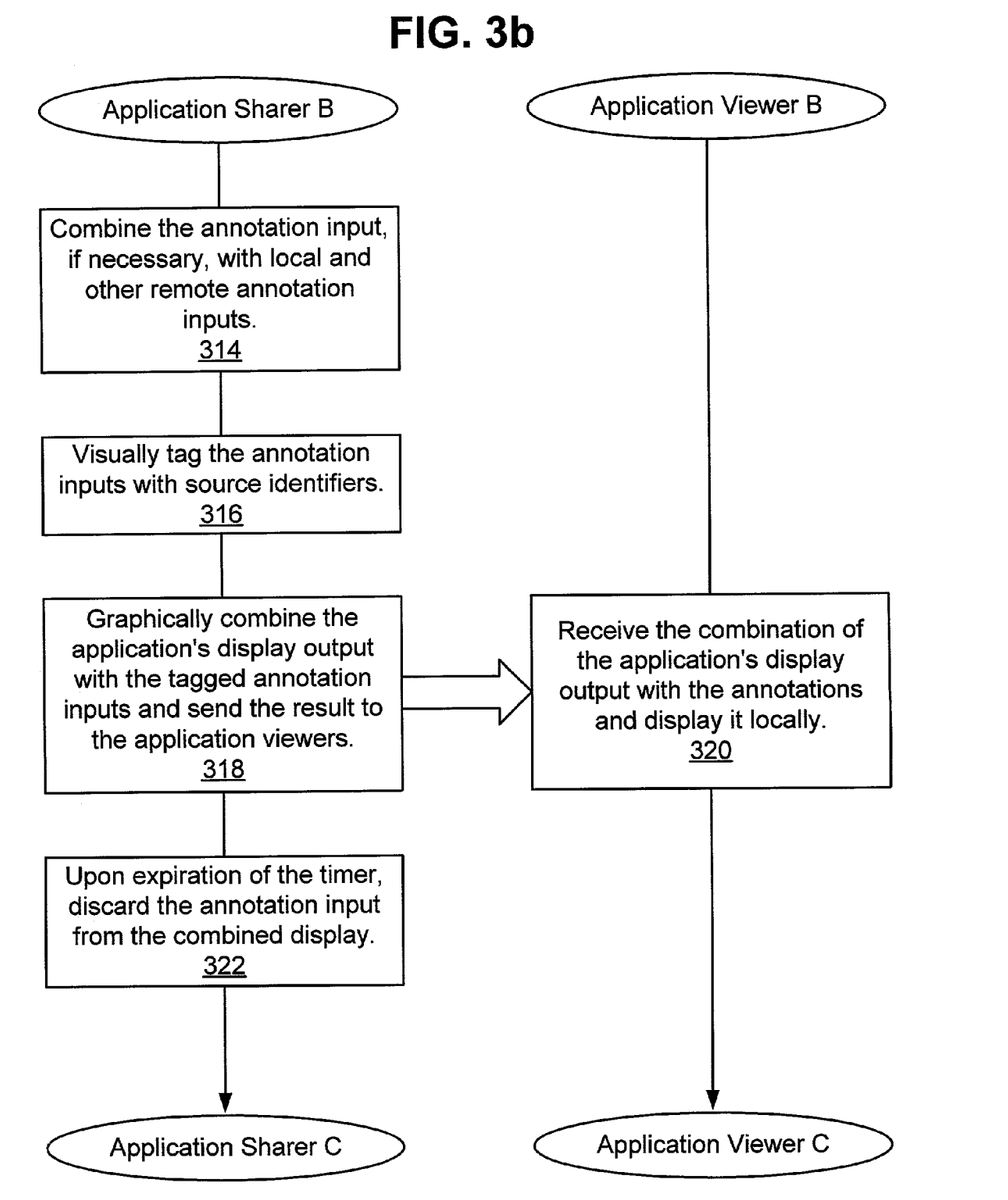
Figure 3C:
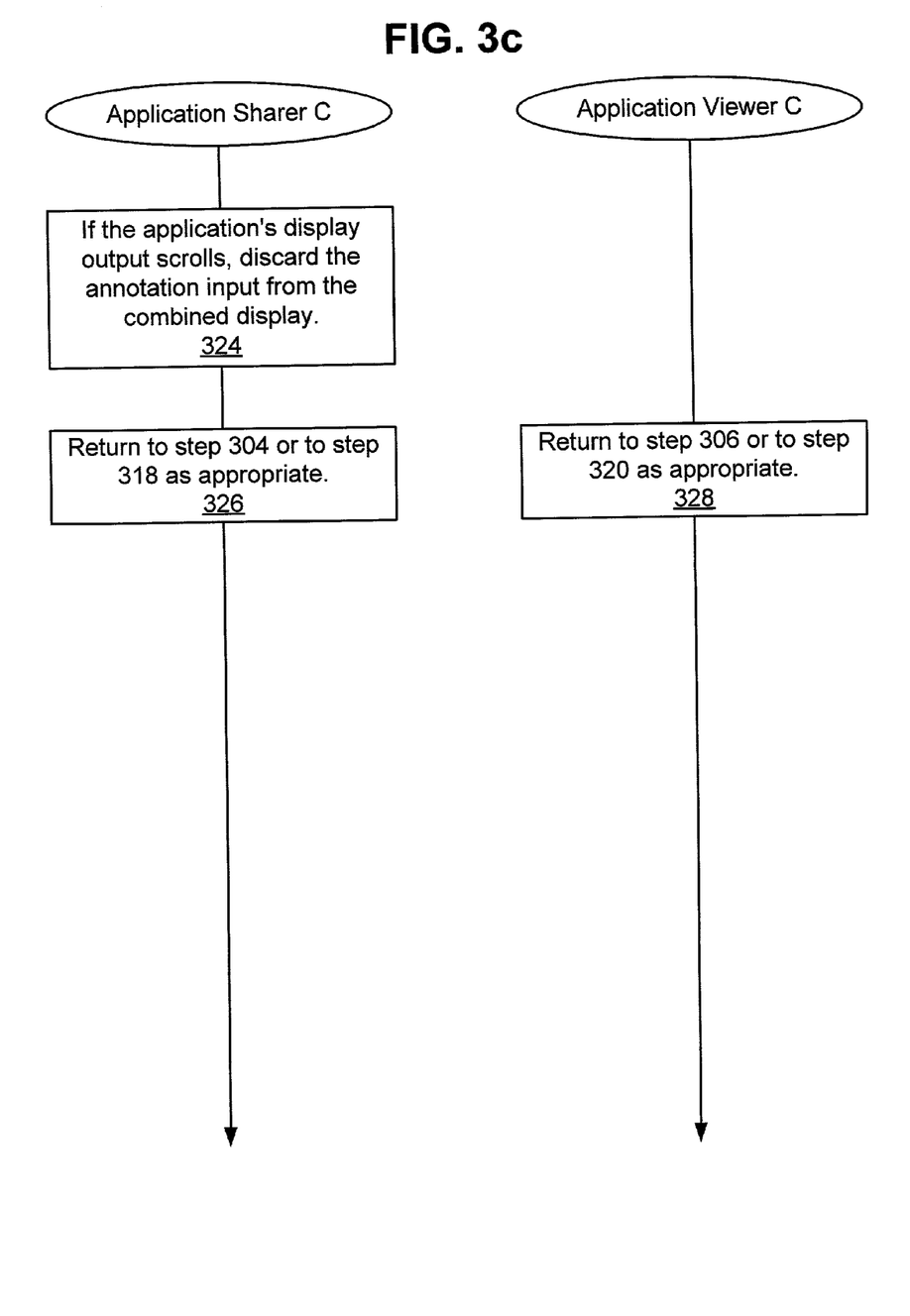

To illustrate one way of implementing the methods of the present invention, FIGS. 3*a* through 3*c* together show the information passed and the operations performed when a user at an application viewer 104 annotates the collaborative application display received from the application sharer 102. In the Figures, time flows downward and from one Figure to the next. Exemplary screen shots and systems that may be used to support the methods of the present invention are presented in later Figures.

In step 300, the application sharer 102 runs the collaborative application, and in step 302, the application sharer 102 and the application viewer 104 initiate their collaborative computing utility programs. As the collaborative application runs, it produces display information. The manner of information displayed depends upon the collaborative application itself and may include, for example, static text, a warning message, toolbars, a picture, full motion video, or a combination of these and other elements. The application sharer 102 chooses to share some or all of this collaborative display information with the application viewers 104. For example, if the application viewers 104 are prevented from sending control input to the collaborative application, then the application sharer 102 may share a video display but not the toolbars. Whatever display information the application sharer 102 chooses to display is captured in step 304 and sent to the application viewers 104. Numerous formats for encoding the collaborative display information are known and include drawing commands, bit maps, and still and live video formats. The application viewer 104's collaborative computing utility program receives the display information and presents it to a user of the application viewer 104 in step 306.

Upon viewing the collaborative application display, the user of the application viewer 104 decides to annotate it. Annotations are designed to call the attention of users at other devices to specific portions of the display. They are not intended to be control inputs sent to the collaborative application itself. In the embodiment of step 308 of FIG. 3*a*, the user annotates the collaborative application display by running a local annotation program, such as a paint utility. Another possibility has the user moving a mouse to a portion of the collaborative application display and clicking it to denote a point of interest. The collaborative computing utility program running on the application viewer 104 decides that this is annotation input meant for the collaborative application display. This decision may be based upon the position of the input: if the input is created over the collaborative application display, then it is presumably associated with that display. In other embodiments, the user may explicitly enter an annotation mode, telling the application viewer 104 that subsequent input is meant for the collaborative application display. In any case, the annotation input is captured in step 310 and sent to the application sharer 102. The set of well known formats for sending display information may also be used in sending annotation information. Note what does not happen at this stage: the annotation input is not displayed at the application viewer 104. This allows the application sharer 102 to centrally coordinate annotation input from all users, as described below.

In step 312, the application sharer 102 receives the annotation input from the application viewer 104 and associates a timer with the annotation input. The timer forms one part of the application sharer 102' mechanism for centralized coordination of annotation input, as described below.

The application sharer 102 may be receiving annotation input from several application viewers 104 and from a user of the application sharer 102 itself. In steps 314 through 318 of FIG. 3*b*, the application sharer 102 combines the annotation inputs with the collaborative application display. These steps are meant as logical illustrations only; some of them may be performed consecutively in some embodiments, simultaneously in other embodiments, or not at all in other embodiments. In computing environments that support display windows, such as MICROSOFT's "WINDOWS" series of operating systems, the application sharer 102 may create a window purely for annotation input and draw each annotation into the window, graphically laying each new annotation over the annotations already present. If that annotation window is set to be transparent, then it is straightforward to graphically combine the contents of the annotation window with the collaborative application display window in step 318. The annotation window would also be set to be "non-activating" so that if a mouse were clicked over the annotation window, the click would not be sent to the annotation window but would be passed on to the collaborative application. This feature allows the user of the application sharer 102 to retain control of the collaborative application in the presence of annotations.

As one aspect of centralized coordination, the application sharer 102 may choose not to display any or all of the received annotations. The user of the collaborative application may choose to turn off annotation for a while and then later open up the display for annotation. One set of users of the application viewers 104 may be permitted to annotate the display while other users cannot. For example, particularly obnoxious users, or their annotations, may be screened. In some embodiments, permission to annotate may be passed from one user to another user just as permission to send input to the collaborative application is often passed around.

Figure 4A:
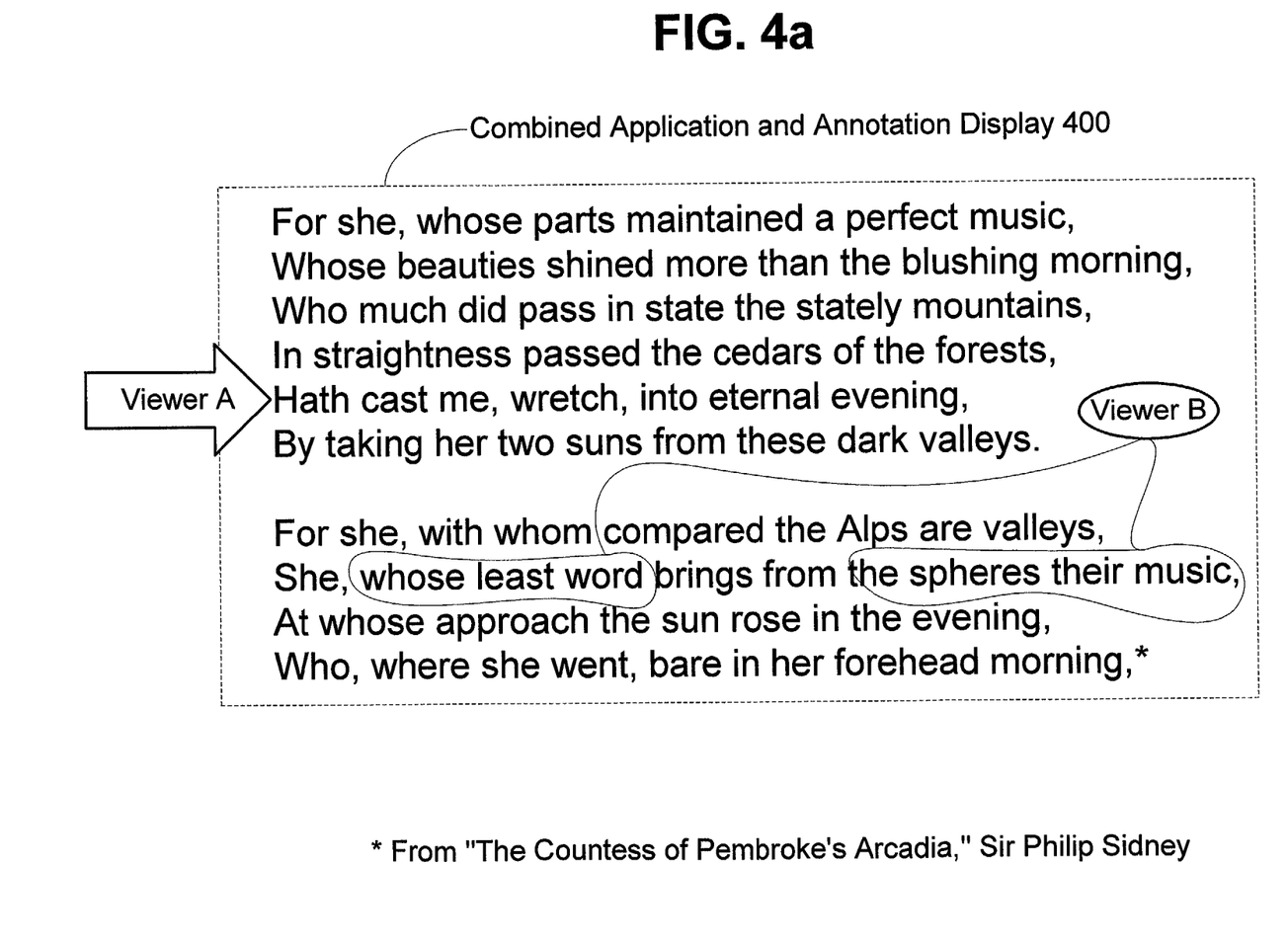
FIG. 4a is an exemplary screen display showing annotations from two application viewers overlaid onto the collaborative application display.

In step 316, the application sharer 102 optionally tags each annotation with an indication of its source. These tags can help to reduce confusion when several users are annotating the same display. Color and text are both useful in tagging annotations. FIG. 4*a*, discussed below, presents an example of tagged annotations.

The annotation inputs that pass the screening of the application sharer 102 are combined with the collaborative application display in step 318 and the result is sent to the application viewers 104. When the combination information is received by the application viewer 104 in step 320, it is displayed in the same manner as the unannotated information is displayed in step 306. In fact, in some embodiments, the application viewer 104 cannot distinguish annotated from unannotated display information. Both are received simply as visual information and are displayed to the user of the application viewer 104. This is why there was no need in step 310 to display the annotation input created in that step on the application viewer 104.

The present invention's centralized coordination of annotation presents the same annotated display to the users of all of the collaborating devices. Because the annotations are graphically merged with the collaborative application display by the application sharer 102, the application viewers 104 do not need to perform this merging.

In the methods as described so far, an annotation, once made, remains forever on the collaborative application display. To prevent an ever-increasing accumulation of outdated annotations, the application sharer 102 in step 322 discards each annotation after displaying it for a set period of time. In another embodiment, the source of the annotation could send a special message to the application sharer 102 saying that the annotation should be removed.

Figure 4B:
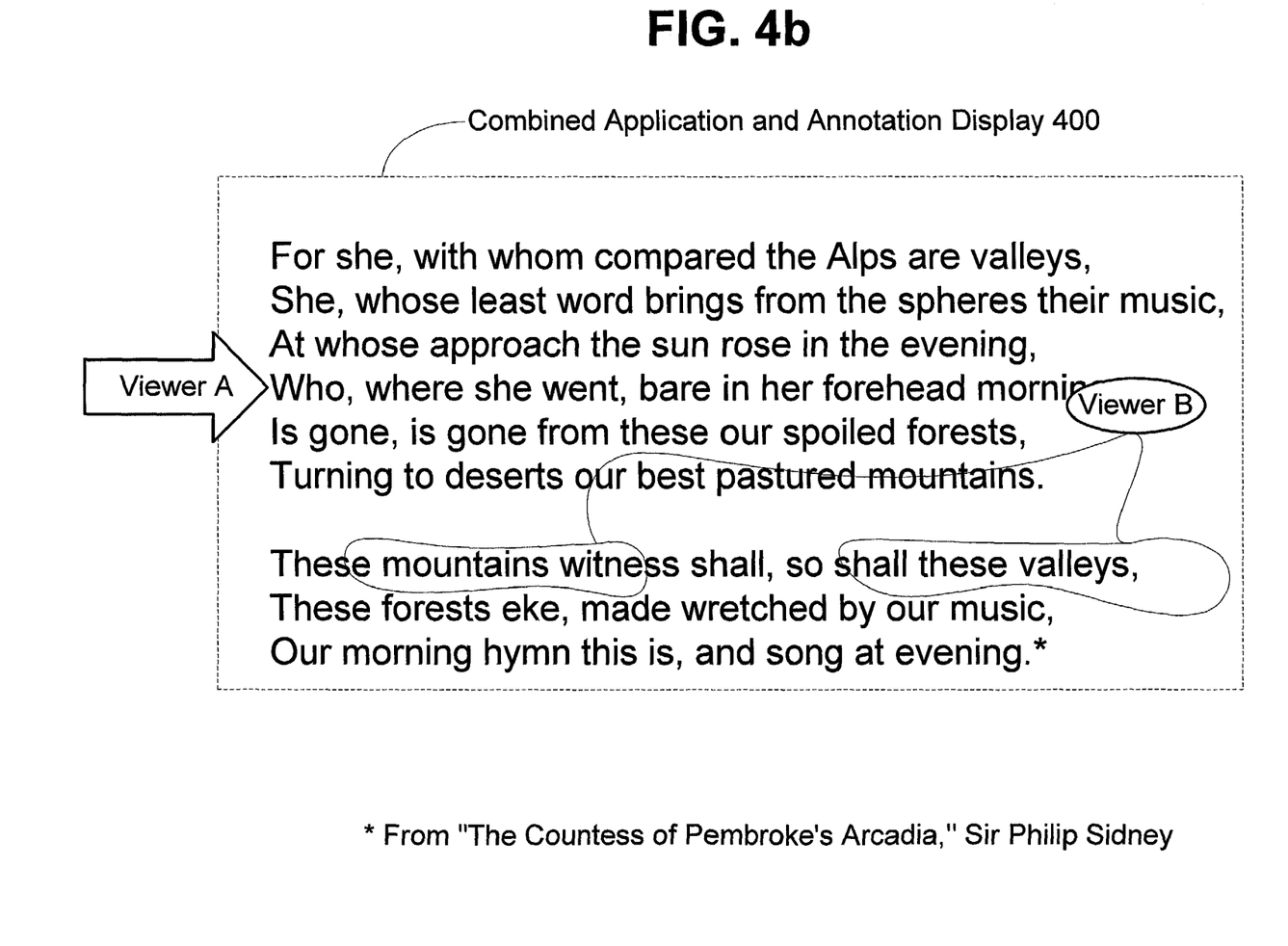
FIG. 4b shows what would happen to the display of FIG. 4a if the shared application scrolled its display and the annotations did not follow with the scroll.

A third method for removing annotations, which may be combined with the first two methods, is presented in step 324. Because annotations are associated with a position on the collaborative application display, they may "lose their places" if the display scrolls underneath them. As an example, consider the exemplary collaborative application display 400 of FIG. 4*a*. The collaborative application is a word processor, here showing a segment from "The Countess of Pembroke's Arcadia" by Sir Philip Sidney. The display currently has three annotations, and each annotation is tagged by its source. Viewer A wants to bring the attention of the other viewers to the line beginning "Hath cast me," while Viewer B is interested in the contrast between the phrases "whose least word" and "the spheres their music." After these annotations are made, but while they are still being displayed, the collaborative display is scrolled, possibly under the direction of a user of the application sharer 102, to the end of the poem. FIG. 4*b* shows an unfortunate result of the scrolling. The three annotations retain their fixed position relative to the collaborative application display, but they have "lost their places" relative to the content of the display, that is, relative to the poem. Because the poem scrolled, the annotations no longer point to where they should in the poem. Out of place, these annotations now serve to confuse rather than enable collaborative efforts. This problem is especially difficult to handle because collaborative applications use numerous methods to move their displays. In order to prevent, or at least to minimize the occurrences of, the situation of FIG. 4*b*, the application sharer 102 in step 324 tries to detect at least some of the methods for moving the display. If it can detect a scroll or other display movement, then the application sharer 102 takes the safe course and simply discards the annotations. If the collaborative application display moves in a manner undetected by the application sharer 102, then the timeout of step 322 eventually resolves the problem by discarding the out-of-place annotations.

In steps 326 and 328, the application sharer 102 and the application viewer 104 repeat the annotating and displaying as long as the collaborative session endures.

If strictly applied, the methods of FIGS. 3*a* through 3*c* are susceptible of producing an enormous amount of annotation traffic. For example, as an annotator at one application viewer 104 moves a mouse across the collaborative application display, the position of the mouse may be transmitted to the application sharer 102 dozens of times per second, each transmission resulting in the application sharer 102 producing a new combined application and annotation display and sending it to all of the application viewers 104. To prevent this, "smoothing" techniques are applied on the application server 102 and on the application viewers 104. Some of these techniques involve a timer. Changes are sent only upon expiration of the timer; the transmission covering everything different from the prior timer expiration. Other techniques involve measuring differences from one display to the next and only sending a display update when the difference is greater than a set threshold value.

Figure 5A:
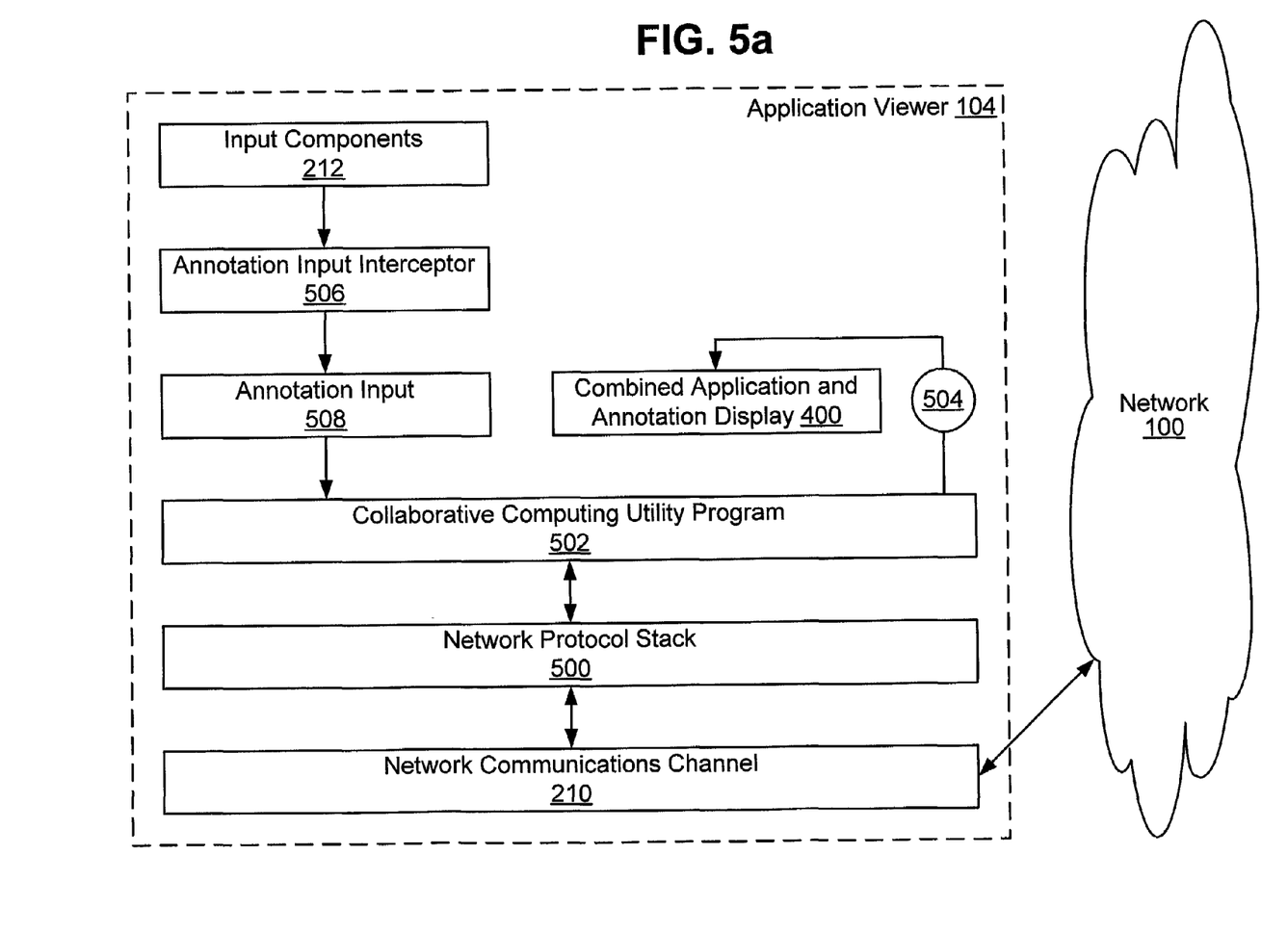
FIG. 5a is a schematic diagram of an exemplary system on an application viewer that supports annotation.

FIG. 5*a* illustrates the basic components of one embodiment of an application viewer 104. The application viewer 104 receives the collaborative display information from the network 100 over a network communications channel 210. The information is passed up a standard network communications protocol stack 500 which handles transmission issues such as session establishment, addressing, error recovery, and the like. The information is next passed to the collaborative computing utility program 502. In some embodiments, this utility 502 need know nothing whatsoever about the collaborative application running on the application sharer 102. It does, however, know how to present, via data flow 504, the collaborative application display 400 to a user of the application viewer 104.

When a user of the application viewer 104 decides to annotate the collaborative application display 400, he uses some input component 212 to "draw" over the display 400. The commands to draw the annotation are intercepted by module 506 and are prevented from having any direct effect on the collaborative application display 400. Instead, the annotation commands 508 are sent to the collaborative computing utility program 502 which packages them and sends them through the network 100 to the application sharer 102.

Figure 5B:
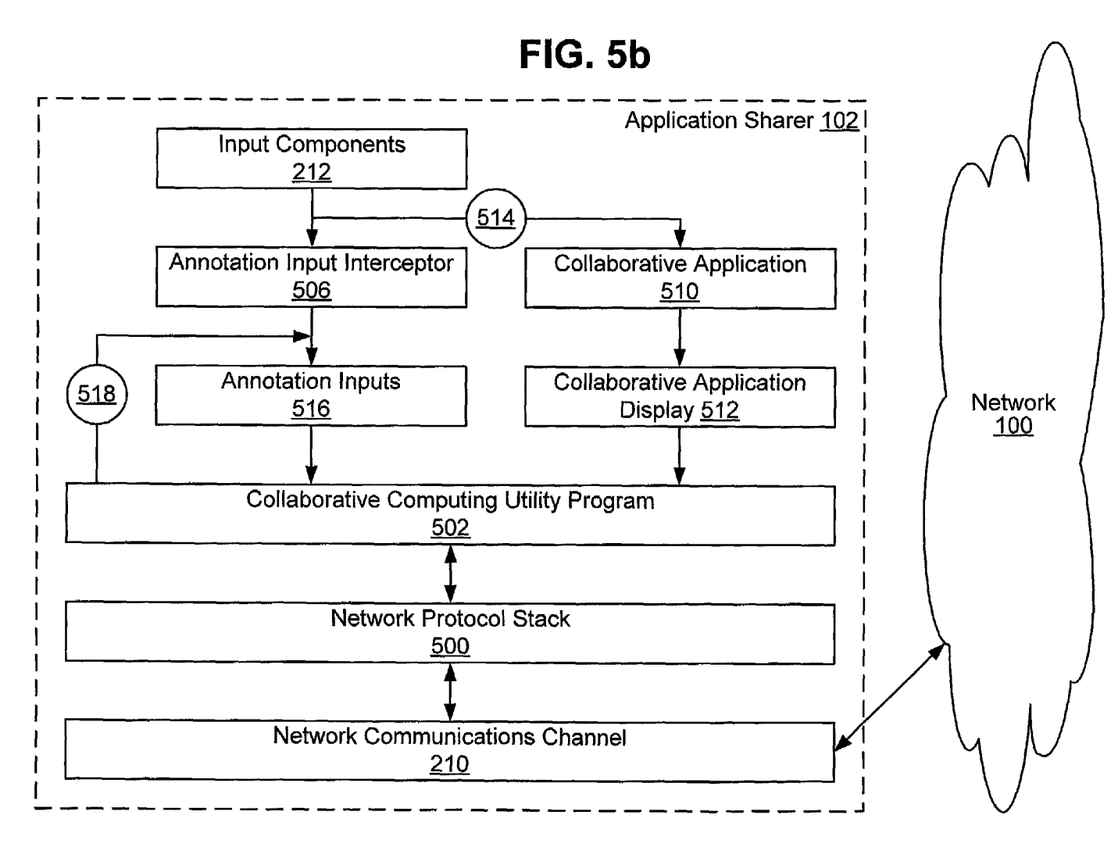
FIG. 5b is a schematic diagram of an exemplary system on an application sharer that supports annotation.

The exemplary application sharer 102 illustrated in FIG. 5*b* contains many of the components of the application viewer 104 of FIG. 5*a* plus a few in addition. First, the application sharer 102 runs the collaborative application 510. The display output of the collaborative application 510 is shown as box 512. This box is different from the combined application and annotation display 400 of FIGS. 4a and 5a because box 512 does not contain any annotation input. When the application sharer 102 receives an annotation from an application viewer 104, the annotation flows up the communications stack to the collaborative computing utility program 502 which collects it, via data flow 518, into the set of annotation inputs 516. In some embodiments, the set of annotation inputs 516 is collected onto the transparent, non-activating window described above in reference to steps 314 through 318 of FIG. 3b. The utility 502 combines the set of current annotations 516 with the collaborative application display 512 and sends the result to the application viewers 104 to be presented as the combined application and annotation display 400.

The user of the application sharer 102 may use that device's input components 212 to send control information, via data flow 514, to the collaborative application 510. That user may also choose to annotate the collaborative application display. The annotation input is handled the same way as on the application viewers 104, being intercepted by module 506 and then sent to join the set of annotation inputs 516.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as display and annotation information message formats, are determined by the protocols chosen for specific situations and can be found in published standards. Although the invention is described in terms of software modules or components, some processes may be equivalently performed by hardware components. Therefore, the invention as described herein contemplates all such embodiments as may come within the scope of the following claims and equivalents thereof.

We claim:

1. In a shared computing environment with an application running on a sharer computing device, the application producing a sharer application display on the sharer computing device, a copy of the sharer application display transmitted to a first viewer computing device for display on the first viewer computing device and transmitted to a second viewer computing device for display on the second viewer computing device, a method for the sharer computing device to accept and share annotation information provided by the first viewer computing device, the method comprising:

under control of the sharer computing device,
receiving input;
providing the received input to the application;
updating the sharer application display based on the received input;
transmitting a copy of the sharer application display to the first viewer computing device and the second viewer computing device;
receiving at the sharer computing device first viewer annotation information from the first viewer computing device wherein the first viewer annotation information is not provided as input to the application running on the sharer computing device;
preparing at the sharer computing device the received first viewer annotation information for display;
combining at the sharer computing device the first viewer annotation information with the sharer application display to create a shared annotated display;
receiving at the sharer computing device second viewer annotation information from the second viewer computing device;
selectively filtering at the sharer computing device the received first and second annotation information, the filtering based on an identity of the sender of the first and second annotation information; and
transmitting the shared annotated display to the first viewer computing device and the second viewer computing device, the shared annotated display including the received first viewer annotation information but not the received second viewer annotation information, so that the first and second viewer computing devices do not display the second viewer annotation information.

2. The method of claim 1 wherein receiving first viewer annotation information comprises receiving drawing commands from the first viewer.

3. The method of claim 1 wherein receiving first viewer annotation information comprises receiving display pointer indications from the first viewer.

4. The method of claim 3 further comprising:
associating a first viewer annotation cursor with the received first viewer annotation information; and
painting the first viewer annotation cursor in association with the received first viewer display pointer indications.

5. The method of claim 1 further comprising:
painting the received first viewer annotation information into a sharer annotation display on the sharer, the sharer annotation display distinct from the sharer application display.

6. The method of claim 5 wherein painting into the sharer annotation display comprises painting into a transparent window overlaid over the sharer application display and setting the transparent window to be non-activating.

7. The method of claim 5 wherein combining the first viewer annotation information with the sharer application display comprises masking the sharer application display together with the sharer annotation display.

8. The method of claim 1 wherein transmitting the shared annotated display comprises transmitting information selected from the group consisting of: drawing commands, current display information, and changes in current display information.

9. The method of claim 1 wherein a copy of the sharer application display is transmitted to the second viewer computing device for display on the second viewer, the method further comprising:
receiving second viewer annotation information from the second viewer;
preparing the received second viewer annotation information for display;
combining at the sharer computing device the second viewer annotation information with the first viewer annotation information and with the sharer application display;
identifying on the sharer application display a source of the first viewer annotation information by associating a first visual tag with the displayed first viewer annotation information;
identifying on the sharer application display a source of the second viewer annotation information by associating a second visual tag with the displayed second viewer annotation information; and
transmitting the combined second viewer annotation information, first viewer annotation information, and sharer application display to the first viewer.

10. The method of claim 9 wherein preparing the received first and second viewer annotation information comprises visually distinguishing the first viewer annotation information from the second viewer annotation information.

11. The method of claim 1 further comprising:
associating a timer with receiving first viewer annotation information; and
upon expiration of the timer, discarding the received first viewer annotation information and transmitting the sharer application display without the first viewer annotation information to the first viewer.

12. The method of claim 1 further comprising:
watching for an indication of scrolling on the sharer application display; and
if an indication of scrolling is seen on the sharer application display, then discarding the received first viewer annotation information and transmitting the sharer application display without the first viewer annotation information to the first viewer computing device.

13. The method of claim 1 further comprising:
associating a timer with transmitting the combined first viewer annotation information and sharer application display; and
delaying further transmitting until expiration of the timer.

14. The method of claim 1 further comprising:
setting an annotation change threshold;
comparing the received first viewer annotation information with previously received first viewer annotation information; and
delaying further transmitting until comparing reveals a change larger than the annotation change threshold.

15. A computer-readable storage medium containing computer-executable instructions for performing a method for a sharer computing device in a shared computing environment to accept and share annotation information provided by a first viewer computing device, an application running on the sharer computing device, the application producing a sharer application display on the sharer computing device, a copy of the sharer application display transmitted to the first viewer computing device, the method comprising:
receiving at the sharer computing device first viewer annotation information from the first viewer computing device wherein the first viewer annotation information is not provided as input to the application running on the sharer computing device;
preparing at the sharer computing device the received first viewer annotation information for display;
receiving at the sharer computing device second viewer annotation information from the second viewer computing device;
selectively filtering the received second viewer annotation information, the filtering based on an identity of the sender of the annotation information;
combining at the sharer computing device the first viewer annotation information with the sharer application display to create a shared annotated display, the shared annotated display including the received first viewer annotation information but not the received second viewer annotation information; and
transmitting the shared annotated display to the first viewer computing device and the second viewer computing device, the shared annotated display including the received first viewer annotation information but not the received second viewer annotation information, so that the first and second viewer computing devices do not display the second viewer annotation information.

16. In a shared computing environment with an application running on a sharer computing device, the application producing a sharer application display on the sharer computing device, a copy of the sharer application display transmitted to a first viewer computing device for display on a first viewer application display on the first viewer computing device, a method for the first viewer computing device to annotate the first viewer application display, the method comprising:
creating first viewer annotation information with reference to the first viewer application display wherein the first viewer annotation information is not provided as input to the application running on the sharer computing device;
capturing the created first viewer annotation information;
transmitting the captured first viewer annotation information to the sharer computing device;
receiving from the sharer computing device a combined first viewer annotation information and sharer application display, wherein the combined first viewer annotation information and sharer application display is combined by a sharer computing device by including the first viewer annotation information but excluding a second viewer annotation information that the sharer computing device received from a second viewer computing device but selectively filtered; and
displaying the combined first viewer annotation information and sharer application display.

17. The method of claim 16 wherein creating first viewer annotation information comprises running a paint program on the first viewer.

18. The method of claim 16 wherein capturing the created first viewer annotation information comprises capturing only that first viewer annotation information created when a first viewer display pointer is determined to lie within the first viewer application display.

19. The method of claim 16 wherein capturing the created first viewer annotation information comprises intercepting drawing commands and preventing those drawing commands from displaying first viewer annotation information in the first viewer application display.

20. The method of claim 16 wherein transmitting the captured first viewer annotation information comprises transmitting drawing commands to the sharer.

21. The method of claim 16 wherein transmitting the captured first viewer annotation information comprises transmitting display pointer indications to the sharer.

22. The method of claim 16 wherein receiving a combined first viewer annotation information and sharer application display comprises receiving information selected from the group consisting of: drawing commands, current display information, and, changes in current display information.

23. The method of claim 16 wherein a copy of the sharer application display is transmitted to a second viewer computing device for display on the second viewer, and wherein receiving a combined first viewer annotation information and sharer application display comprises receiving a combined first viewer annotation information, second viewer annotation information, and sharer application display from the sharer, and wherein displaying the combined first viewer annotation information and sharer application display comprises displaying the combined first viewer annotation information, second viewer annotation information, and sharer application display.

24. The method of claim 16 further comprising:
associating a timer with transmitting the captured first viewer annotation information; and delaying further transmitting until expiration of the timer.

25. The method of claim 16 further comprising:
setting an annotation change threshold;
comparing the captured first viewer annotation information with previously captured first viewer annotation information; and
delaying further transmitting until comparing reveals a change larger than the annotation change threshold.

26. A computer-readable storage medium containing computer-executable instructions for performing a method for a first viewer computing device in a shared computing environment to annotate a first viewer application display, an application running on a sharer computing device, the application producing a sharer application display on the sharer computing device, a copy of the sharer application display transmitted to the first viewer computing device for display on the first viewer application display, the method comprising:
creating first viewer annotation information with reference to the first viewer application display wherein the first viewer annotation information is not provided as input to the application running on the sharer computing device;
capturing the created first viewer annotation information;
transmitting the captured first viewer annotation information to the sharer computing device;
receiving from the sharer computing device a combined first viewer annotation information and sharer application display from the sharer, wherein the combined first viewer annotation information and sharer application display is combined by a sharer computing device by including the first viewer annotation information but excluding a second viewer annotation information that the sharer computing device received from a second viewer computing device but selectively filtered; and
displaying the combined first viewer annotation information and sharer application display.

27. In a shared computing environment with an application running on a sharer computing device, the application producing a sharer application display on the sharer, a copy of the sharer application display transmitted to a first viewer computing device for display on a first viewer application display on the first viewer computing device, a method for sharing annotation information provided by the first viewer computing device, the method comprising:
creating, on the first viewer computing device, first viewer annotation information with reference to the first viewer application display wherein the first viewer annotation information is not provided as input to the application running on the sharer computing device;
capturing, on the first viewer computing device, the created first viewer annotation information;
transmitting, from the first viewer computing device to the sharer computing device, the captured first viewer annotation information;
selectively filtering, on the sharer computing device, a second viewer annotation information that the sharer computing device received from a second viewer computing device based on an identification of a second viewer computing device so that the first viewer annotation information is shared but the second viewer annotation information is not shared;
preparing, on the sharer computing device, the received first viewer annotation information for display;
combining, on the sharer computing device, the first viewer annotation information with the sharer application display;
transmitting, from the sharer computing device to the first viewer computing device, the combined first viewer annotation information and sharer application display to the first viewer computing device; and
displaying, on the first viewer computing device, the combined first viewer annotation information and sharer application display but not the second viewer annotation information.

28. A method performed by a computing system for sharing annotation information provided by a first viewer computing device, the computing system comprising an application running on a sharer computing device, the application producing a sharer application display on the, sharer computing device, a copy of the sharer application display transmitted to the first viewer for display on a first viewer application display on the first viewer computing device, the method comprising:
creating, on the first viewer computing device, first viewer annotation information with reference to the first viewer application display wherein the first viewer annotation information is not provided as input to the application running on the sharer computing device;
capturing, on the first viewer computing device, the created first viewer annotation information;
transmitting, from the first viewer computing device to the sharer computing device, the captured first viewer annotation information;
selectively filtering, on the sharer computing device, a second viewer annotation information that the sharer computing device received from a second viewer computing device, the filtering based on an identification of a second viewer computing device so that the first viewer annotation information is shared but the second viewer annotation information is not shared;
preparing, on the sharer computing device, the received first viewer annotation information for display;
combining, on the sharer computing device, the first viewer annotation information with the sharer application display;
transmitting, from the sharer computing device to the first and second viewer computing devices, the combined first viewer annotation information and sharer application display, but not the received second viewer annotation information, so that the second viewer computing device does not display the second viewer annotation information; and
displaying, on the first viewer computing device, the combined first viewer annotation information and sharer application display.

* * * * *